United States Patent [19]

Liang et al.

[11] Patent Number: 5,642,021

[45] Date of Patent: Jun. 24, 1997

[54] METHOD AND SYSTEM FOR CONTROLLING AN ALTERNATOR TO OPTIMIZE DIRECT CURRENT OUTPUT

[75] Inventors: Feng Liang, Canton; John Michael Miller, Saline; Xingyi Xu, Canton, all of Mich.

[73] Assignee: Ford Motor Company, Dearborn, Mich.

[21] Appl. No.: 566,749

[22] Filed: Dec. 4, 1995

[51] Int. Cl.$^6$ .................................................. H02P 5/20
[52] U.S. Cl. .......................... 318/146; 318/148; 318/154; 363/89
[58] Field of Search ...................... 318/146, 148, 318/154; 388/909; 307/10.1, 112, 120, 116, 139; 363/89, 52, 84; 322/59, 93

[56] References Cited

U.S. PATENT DOCUMENTS

| | | | |
|---|---|---|---|
| 3,984,750 | 10/1976 | Pfeffer et al. | 307/10.1 X |
| 4,667,282 | 5/1987 | Peterson | 363/89 |
| 4,709,203 | 11/1987 | Roux et al. | 322/59 X |
| 4,924,371 | 5/1990 | Peterson | 363/89 |
| 5,057,763 | 10/1991 | Torii et al. | 322/93 X |
| 5,281,905 | 1/1994 | Dhyanchand et al. | 322/93 X |
| 5,418,401 | 5/1995 | Kaneyuki | 307/10.1 |

*Primary Examiner*—Karen Masih
*Attorney, Agent, or Firm*—Mark S. Sparschu; Roger L. May

[57] ABSTRACT

A method and system for maximizing the output of an alternator in an automotive vehicle. An alternator is provided having a first rectifier connectable to a first output of the alternator to form a first winding configuration and a second rectifier connectable to a second output of the alternator to form a second winding configuration. Based on the speed of the alternator, a controller operatively couples one of the first and second rectifiers to the first and second outputs, respectively, so as to maximize output current of the alternator. If the speed of the alternator is below a predetermined speed range, the controller couples the first output of the alternator to the first rectifier. Alternatively, if the speed of the alternator is above the predetermined speed range, the controller couples the second output of the alternator to the second rectifier.

16 Claims, 5 Drawing Sheets

METHOD AND SYSTEM FOR CONTROLLING AN ALTERNATOR TO OPTIMIZE DIRECT CURRENT OUTPUT

CROSS-REFERENCE TO RELATED APPLICATIONS

This application is related to co-pending application having Ser. No. 08/523,761, filed Sep. 5, 1995, and entitled "Motor Vehicle Alternator And Methods Of Operation".

TECHNICAL FIELD

This invention relates to methods and systems for controlling an alternator to optimize direct current output in an automotive vehicle.

BACKGROUND ART

An alternator is typically utilized to provide a direct current (DC) output and to maintain the electrical charge on a battery. A conventional motor vehicle alternator includes a three phase stator winding with a rotor magnetically coupled to the stator and driven by the vehicle's internal combustion engine. As the rotor is driven, three phase current generated at the output connections of the stator windings is rectified by a three phase diode rectifier. The output current and efficiency of the alternator vary with the speed of the engine which is controlled in accordance with the operational requirements of the vehicle. At low and high speeds, the alternator output may be insufficient to provide the power needed to operate some or all of the electrical equipment of the vehicle. Also at high speeds, the efficiency, or economy, of the alternator may not be maximized.

Accordingly, there is a need for increasing the output current and/or efficiency of the alternator without increasing the volume or weight of the alternator.

DISCLOSURE OF THE INVENTION

A general object of the present invention is to provide a method and system to maximize output current and/or efficiency of the alternator at various alternator speeds.

In carrying out the above object and other objects, features and advantages, of the present invention, a method is provided for controlling the electrical output of the alternator. An alternator, for example in a motor vehicle, is provided having a first rectifier connectable to a first output of the alternator to form a first winding configuration and a second rectifier connectable to a second output of the alternator to form a second winding configuration. A rotational speed of the alternator is determined and a corresponding speed signal is generated. One of the first and second rectifiers is then coupled to the first and second outputs respectively based on the speed signal so as to maximize current output of the alternator.

In further carrying out the above objects and other objects, features and advantages, of the present invention, a system is also provided for performing the method of operation of the present invention. The system includes an alternator having a first rectifier connectable to a first output of the alternator to form a first winding configuration and a second rectifier connectable to a second output of the alternator to form a second winding configuration. The system also includes a controller, operatively coupled to the alternator, for determining a speed of the alternator and generating a corresponding speed signal, and generating a control signal for operatively coupling one of the first and second rectifiers to the first and second outputs respectively based on the speed signal so as to maximize current output of the alternator.

The above object and other objects, features and advantages of the present invention are readily apparent from the following detailed description of the best mode for carrying out the invention when taken in connection with the accompanying drawings.

BEST MODES FOR CARRYING OUT THE INVENTION

A battery, for example in a motor vehicle, is charged via an alternator. The alternator is mechanically driven by an internal combustion engine to generate a direct current (DC) output, for example, to charge the battery of the motor vehicle and operate electrical equipment of the motor vehicle. The alternator typically comprises a three phase stator winding having three output connections. A rotor is typically magnetically coupled to the stator winding and mechanically driven to generate a back electromotive force in the stator winding and thereby generate three phase power at the three output connections of the stator winding. Since an alternator generates three phase alternating current, it is necessary to rectify the alternating current at the three output connections by means of rectifier diodes to provide DC output.

Figure 1:
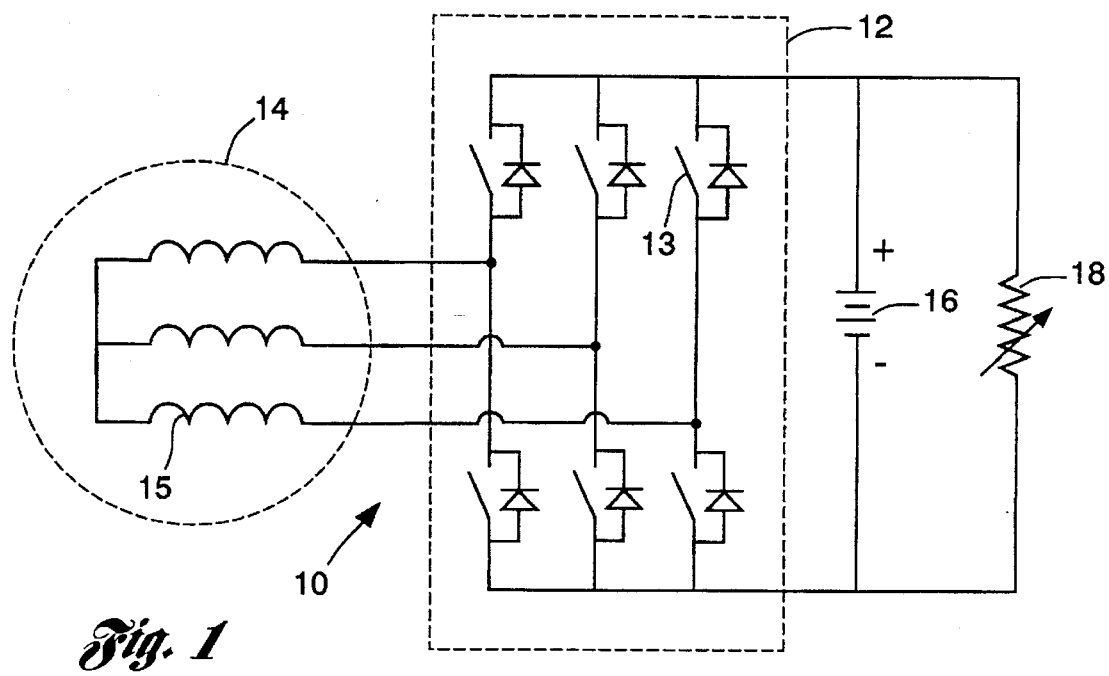
FIG. 1 is a schematic block diagram of an alternator having a synchronous rectifier.

Turning now to FIG. 1, there is shown a typical alternator, denoted generally by reference numeral 10, wherein a conventional full wave diode rectifier of the alternator 10 is replaced with a synchronous, or full wave controlled, rectifier 12 having controlled switches 13 in place of diodes. The controlled switches 13 are preferably semiconductor switches. The alternator 10 further includes a three phase stator winding 14 having three windings 15 coupled to each other at one end and to the synchronous rectifier 12 at the other end. The output of the synchronous rectifier 12 is connected to a battery 16 and an electrical load 18, such as a radio, head lights or any other electrical equipment of the motor vehicle.

Phase control of the alternator 10 shown in FIG. 1 is performed by the switches 13 of the synchronous rectifier 12 to preempt natural commutation and shift the phase of the alternator phase voltages relative to the phase currents as disclosed in application having U.S. Ser. No. 08/523,761, filed Sep. 5, 1995, entitled "Motor Vehicle Alternator And Methods Of Operation", incorporated herein by reference. The phase angle control disrupts the normal unity power factor operation of the alternator and causes additional reactive current flow in the three phase stator winding of the alternator 10.

Figure 2:
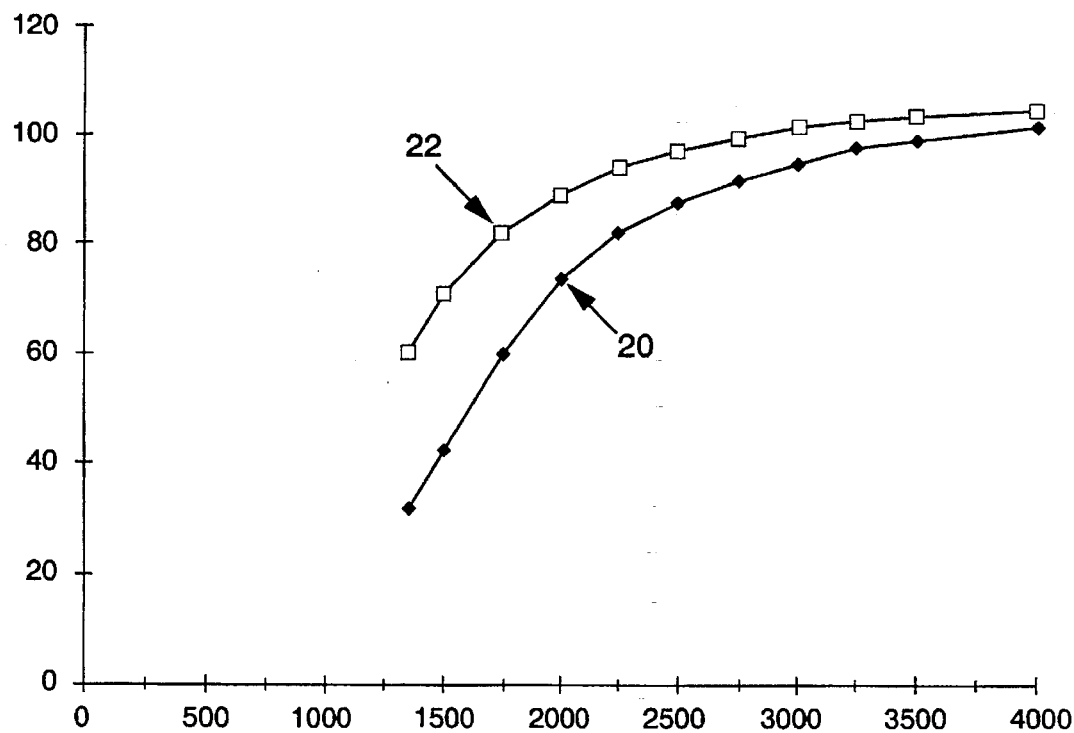
FIG. 2 is a graphical representation of the performance of an alternator having a synchronous rectifier vs. a diode rectifier.

Turning now to FIG. 2, there is a graphical representation of the output of the alternator 10 having different rectifiers. Graph 20 represents the current output of the alternator 10 having a typical diode rectifier. Graph 22 represents the current output of the alternator 10 having the synchronous rectifier 12 shown in FIG. 1. The controlled switches 13 of the synchronous rectifier 12 boost output from the alternator by from 40% to 60% at low alternator speeds. The improvement, however, is not as significant for higher alternator speeds.

Figure 3:
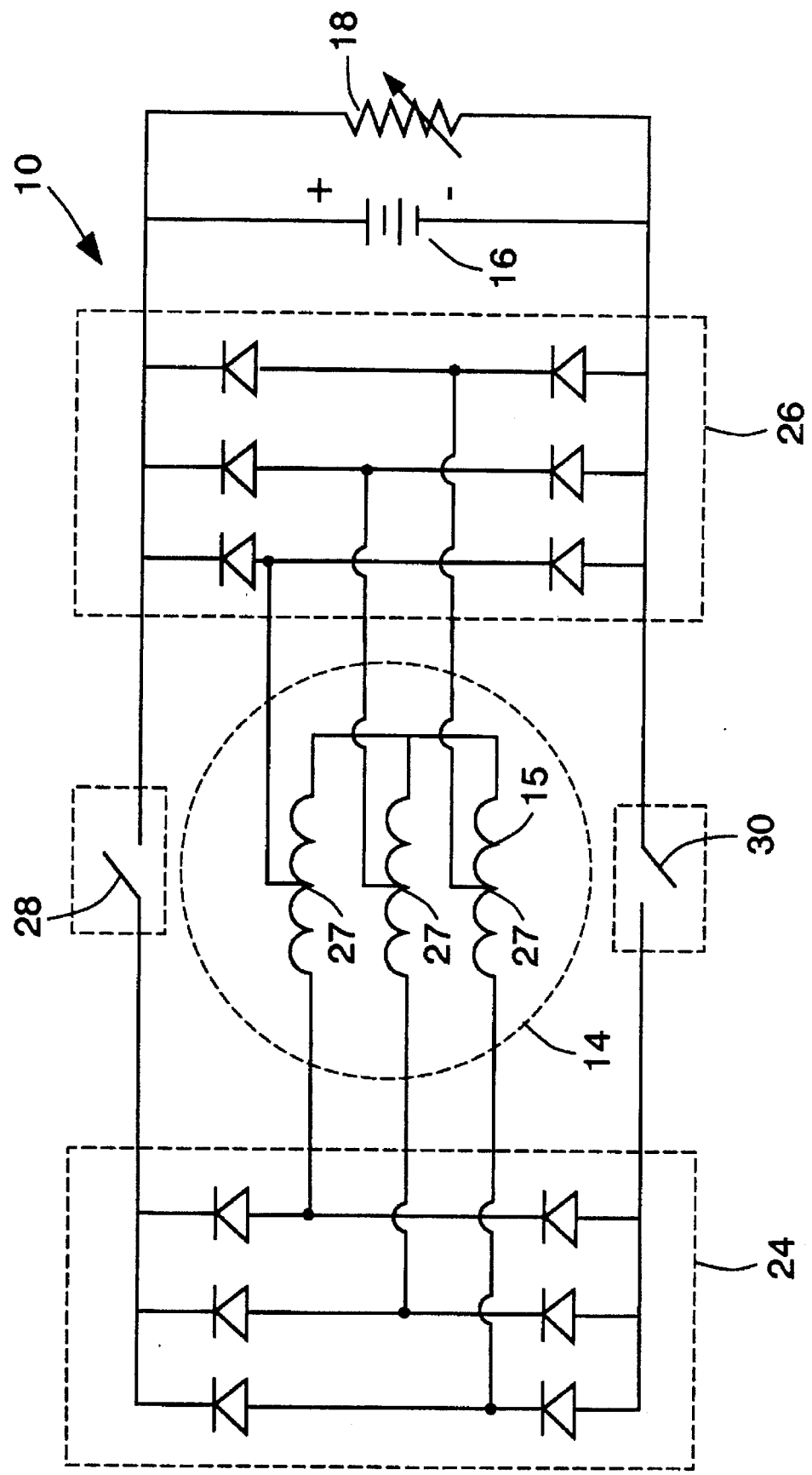
FIG. 3 is a schematic block diagram of an alternator having different winding configurations.

Turning now to FIG. 3, there is shown the alternator 10 in which the three phase stator winding 14 is adapted to have different winding configurations. A first diode rectifier 24 is connected to a first output of the windings 15. A second diode rectifier 26 is connected to a second output, or center tap 27, of the windings 15.

The alternator configuration further includes a first and second switch 28, 30. The first switch 28 is coupled between the first diode rectifier 24 and the positive terminal of the battery 16. The second switch 30 is coupled between the first diode rectifier 24 and the negative terminal of the battery 16. The first and second switches 28, 30 can be either semiconductor switches or relays and are utilized to change the winding configuration of the alternator 10.

Figure 4:
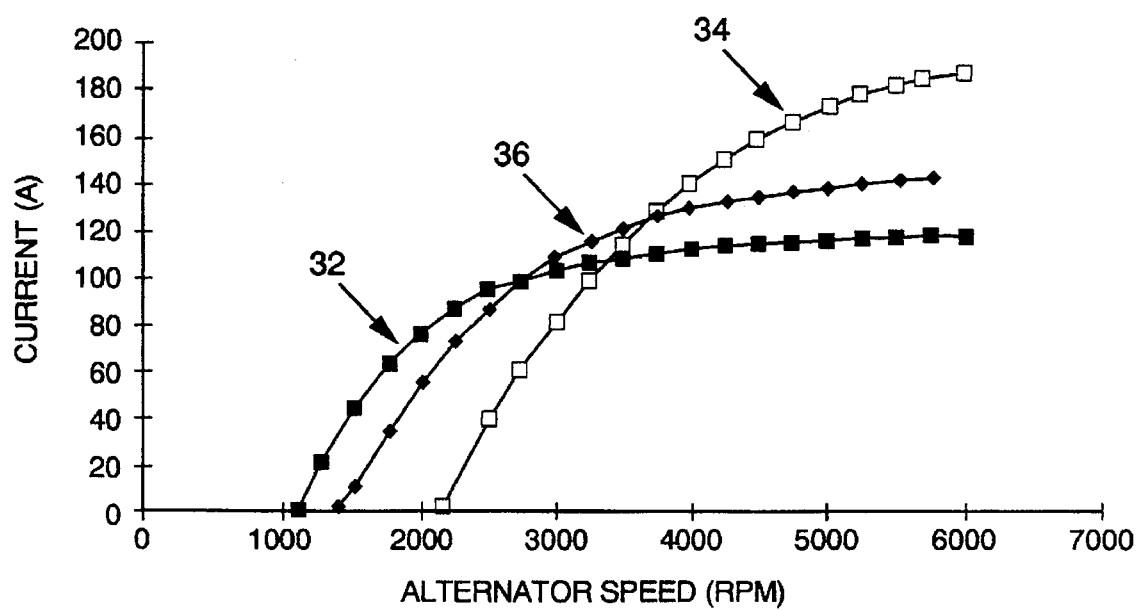
FIG. 4 is a graphical representation of the performance of the alternator illustrated in FIG. 3.

Turning now to FIG. 4, there is shown a graphical representation of the output current of the alternator 10 in three different winding configurations. Graph 32 represents the output current of the alternator 10 when both the first switch 28 and the second switch 30 are turned on and all the windings 15 of the stator winding 14 are used.

Graph 34 represents the output current of the alternator 10 when both the first switch 28 and the second switch 30 are turned off and only a portion of the windings 15 of the stator winding 14 are used. Furthermore, Graph 36 represents the output current of the alternator 10 when the first switch 28 is turned off and the second switch 30 is turned on and a portion of the windings 15 is disabled. As can be seen in FIG. 4, the output current increases significantly after the winding configuration is changed at high alternator speeds.

Figure 5:
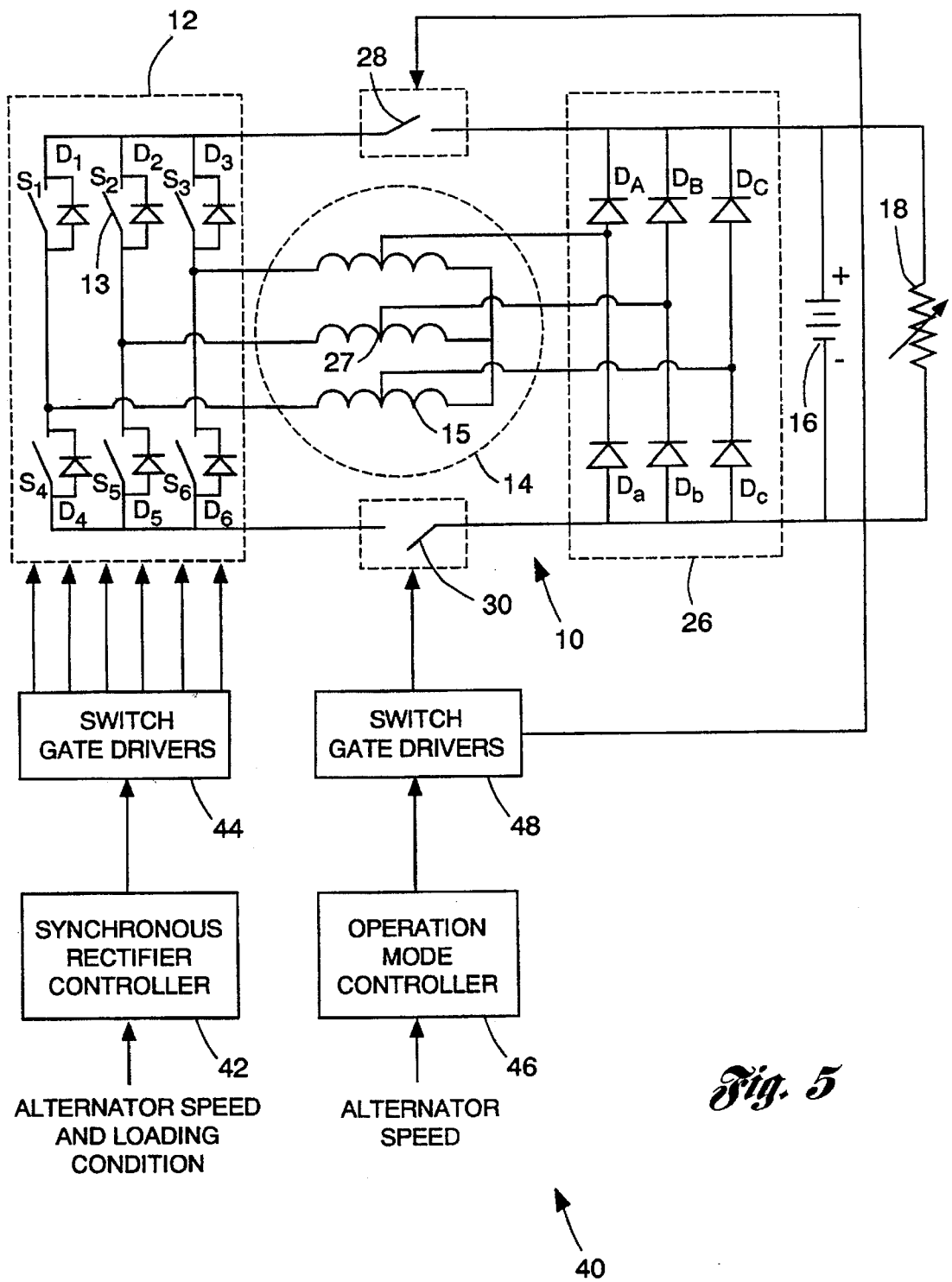
FIG. 5 is a schematic block diagram of a system including an alternator operable in accordance with the present invention.

The current output and/or efficiency of the alternator 10 increases significantly at both high and low alternator speeds if the alternator 10 includes both synchronous rectification and winding reconfiguration. Turning now to FIG. 5, there is shown a schematic block diagram of a charging system, denoted generally by reference numeral 40, including the alternator 10 operable in accordance with the present invention. The first diode rectifier 24 shown in FIG. 3 is replaced with the synchronous rectifier 12 of FIG. 1.

The synchronous rectifier 12 is controlled by a synchronous rectifier controller 42 via a plurality of switch gate drivers 44. The synchronous rectifier controller 42 determines and sets the switch conduction time for the controlled switches 13 based on the speed of the alternator 10 and loading conditions. The synchronous rectifier controller 42 thus controls the conduction state of the controlled switches 13 of the controlled rectifier 12. The controlled rectifier 12 is operated as described in co-pending application having U.S. Ser. No. 08/523,761, filed Sep. 5, 1995, entitled "Motor Vehicle Alternator And Methods Of Operation".

The charging system 40 further includes an operation mode controller 46 for controlling the first and second switches 28, 30 via a second set of switch gate drivers 48. The operation mode controller 46 controls the first and second switches 28, 30 based on the speed of the alternator 10. The speed of the alternator 10 may be sensed directly or, alternatively, determined from the speed of the engine (not shown).

Figure 6:
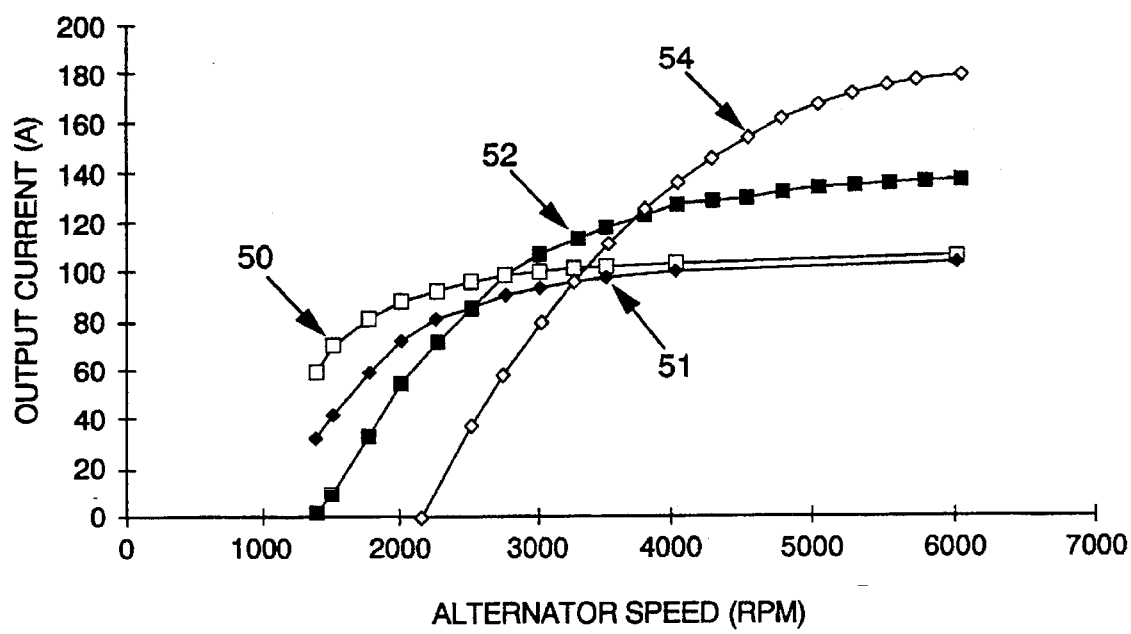
FIG. 6 is a graphical representation of the improvement in alternator performance in accordance with the present invention.

The operation of the charging system 40 will now be described. In a first operating mode, first and second switches 28, 30 are turned on. The diode rectifier 26 has no effect on the output of the alternator 10 because the input AC voltage to the diode rectifier 26 is less than the input AC voltage to the synchronous rectifier 12. Therefore, in the first operating mode the synchronous rectifier 12 is utilized and all the turns of the windings 15 are also utilized. As shown in FIG. 6, the output performance of the alternator 10 during the first operating mode, as shown by graph 50, is maximized. The graph at 51 represents the output performance of a typical alternator having a typical diode rectifier.

In a second operating mode, the first switch 28 is turned off and the second switch 30 is turned on. Furthermore, all the controlled switches 13 in the synchronous rectifier 12 are turned off. In the second operating mode, only the three upper diodes $D_A$, $D_B$, and $D_C$ in the diode rectifier 26 and the diodes of the three lower controlled switches 13 in the synchronous rectifier 12, i.e., $D_4$, $D_5$, and $D_6$, can conduct. Consequently, part of the turns of the windings 15 is disabled. Referring again to FIG. 6, the performance of the alternator 10 has a maximum output current at intermediate alternator speeds, as shown by graph 52.

In a third operating mode, the first and second switches 28, 30 and all the controlled switches 13 in the synchronous rectifier 12 are turned off. Therefore, the synchronous rectifier 12 is totally disabled and only a part of the windings 15 is utilized. It can be seen in FIG. 6 that the third operating mode yields the highest output current at high alternator speeds, as shown by graph 54.

If the operating mode is changed based on the speed of the alternator 10, maximum output current can be obtained at all speeds. Thus, the operation mode controller 46 operates the alternator 10 based on the speed of the alternator 10. The speed of the alternator 10 is compared to a predetermined speed range. If the speed of the alternator 10 is less than the predetermined speed range, the operation mode controller 46 generates a control signal to turn on the first and second switches 28, 30 so that the synchronous rectifier 12 is enabled and the output current of the alternator 10 is maximized.

If the speed of the alternator 10 is greater than the predetermined speed range, the operation mode controller 46 generates a control signal to turn off the first and second switches 28, 30 so that only the diode rectifier 26 is enabled. Furthermore, If the speed of the alternator 10 is within the predetermined speed range, or intermediate alternator speed, the operation mode controller 46 generates a control signal to turn off the first switch 28 and turn on the second switch 30.

The efficiency of the charging system 40 will be significantly increased by changing the operating mode of the alternator 10 according to the alternator speed when the demanded current of the load 18 is less than the maximum output current of the charging system 40. The output current can be reduced to meet the current demand of the load 18 by reducing the field current of the alternator.

Figure 7:
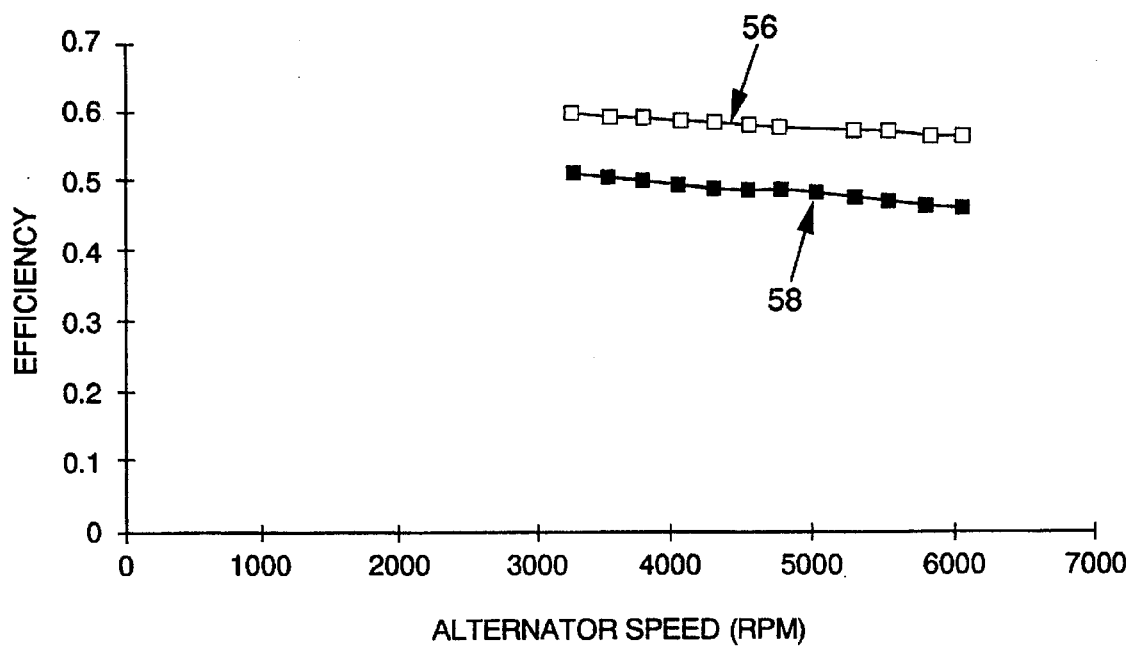
FIG. 7 is a graphical representation of the improvement in efficiency of the charging system of the present invention.

Turning now to FIG. 7, there is shown a graphical representation of the improvement in efficiency of the charging system 40 of the present invention. FIG. 7 illustrates that with the same output current the efficiency of charging system 40 of the present invention, as shown by graph 56, is significantly higher than that of an existing typical system, as shown by graph 58. As an example, consider a vehicle speed of 45 mph which corresponds to an alternator speed ranging from 3800 rpm to 5600 rpm, depending on the powertrain and pulley ratios chosen. The efficiency of the alternator is improved considerably in the 3800 rpm to 5600 rpm speed range which results in a decrease in the engine power required to drive the alternator and, therefore, an increase in a fuel economy of the vehicle.

While the best modes for carrying out the invention have been described in detail, those familiar with the art to which this invention relates will recognize various alternative designs and embodiments for practicing the invention as defined by the following claims.

What is claimed is:

1. For use with an alternator having a stator winding including a plurality of coils and a first output and a second output, the alternator further having a first rectifier connectable to the first output to form a first winding configuration enabling all of the plurality of coils and a second rectifier connectable to the second output to form a second winding configuration enabling a portion of the plurality of coils, a method for controlling the alternator to optimize DC output current comprising:

generating a speed signal corresponding to the rotational speed of the alternator; and coupling one of the first and second rectifiers to one of the first and second outputs respectively in response to said speed signal so as to maximize the output current of the alternator and keep output voltage substantially constant.

2. The method as recited in claim 1 wherein coupling includes comparing the speed signal with a predetermined speed range.

3. The method as recited in claim 2 wherein coupling includes coupling the first rectifier to the first output in response to the speed signal being less than the predetermined speed range.

4. The method as recited in claim 2 wherein coupling includes coupling the second rectifier to the second output in response to the speed signal having a value exceeding the predetermined speed range.

5. The method as recited in claim 1 wherein the alternator includes at least one switch operatively coupled between the first and second rectifiers and wherein coupling includes switching the switch.

6. The method as recited in claim 2 wherein a combination of the first and second rectifiers with the first and second outputs form a third winding configuration enabling a second portion of the plurality of coils and wherein coupling includes coupling the first and second rectifiers to the first and second outputs to form the third winding configuration when the speed signal has a value within the predetermined speed range so as to maximize output current of the alternator at intermediate alternator speeds.

7. The method as recited in claim 1 further comprising coupling the alternator to a battery of a motor vehicle so that the alternator charges the battery and operates equipment of the motor vehicle.

8. For use with an alternator having a stator winding including a plurality of coils and a first output and a second output, a system for maximizing the DC output current of the alternator comprising:

a first rectifier connectable to the first output of the alternator to form a first winding configuration enabling all of the plurality of coils;

a second rectifier connectable to the second output of the alternator to form a second winding configuration enabling a portion of the plurality of coils;

a sensor for sensing a rotational speed of the alternator and generating a corresponding speed signal; and a controller, operatively coupled to the alternator, to couple one of the first and second outputs to one of the first and second rectifiers based on the speed signal so as to maximize output current of the alternator and keep output voltage substantially constant.

9. The system as recited in claim 8 wherein the controller further compares the speed signal with a predetermined speed range.

10. The system as recited in claim 9 wherein the control signal operatively couples the first output of the alternator to the first rectifier in response to the speed signal being less than the predetermined speed range.

11. The system as recited in claim 10 wherein the first rectifier is a synchronous rectifier having controlled switches.

12. The system as recited in claim 9 wherein the control signal operatively couples the second output of the alternator to the second rectifier in response to the speed signal having a value exceeding the predetermined speed range.

13. The system as recited in claim 12 wherein the second rectifier is a full wave diode rectifier.

14. The system as recited in claim 8 wherein the alternator includes at least one switch operatively coupled between the first and second rectifier and wherein the control signal is generated for switching the switch.

15. The system as recited in claim 9 wherein a combination of the first and second rectifiers with the first and second outputs form a third winding configuration enabling a second portion of the plurality of coils and wherein the controller further generates the control signal to couple the first and second rectifiers to the first and second outputs to form the third winding configuration when the speed signal has a value within the predetermined speed range so as to maximize output current of the alternator at intermediate alternator speeds.

16. The system as recited in claim 8 wherein the alternator is coupled to a battery of a motor vehicle to charge the battery and operate equipment of the motor vehicle.

* * * * *